(12) United States Patent
Foley

(10) Patent No.: US 7,685,586 B1
(45) Date of Patent: Mar. 23, 2010

(54) GLOBAL ESCAPE ANALYSIS USING INSTANTIATED TYPE ANALYSIS

(75) Inventor: Sean C. Foley, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/407,755

(22) Filed: Mar. 19, 2009

(51) Int. Cl.
*G06F 9/45* (2006.01)

(52) U.S. Cl. ................... 717/154; 717/116; 717/152

(58) Field of Classification Search ............ None
See application file for complete search history.

(56) References Cited

U.S. PATENT DOCUMENTS

| | | | |
|---|---|---|---|
| 6,381,738 B1 | 4/2002 | Choi et al. | |
| 6,457,023 B1 | 9/2002 | Pinter et al. | |
| 6,463,581 B1 * | 10/2002 | Bacon et al. | 717/154 |
| 6,505,344 B1 | 1/2003 | Blais et al. | |
| 6,675,378 B1 | 1/2004 | Schmidt | |
| 6,681,385 B1 | 1/2004 | Steensgaard et al. | |
| 6,862,729 B1 | 3/2005 | Kuch et al. | |
| 6,865,730 B1 * | 3/2005 | Burke et al. | 717/116 |
| 6,925,638 B1 | 8/2005 | Koved et al. | |
| 7,058,943 B2 | 6/2006 | Blais et al. | |
| 7,111,294 B2 | 9/2006 | Steensgaard | |
| 7,152,229 B2 | 12/2006 | Chong et al. | |
| 7,168,071 B2 | 1/2007 | Wu et al. | |
| 7,496,894 B2 | 2/2009 | Das | |
| 7,496,906 B2 | 2/2009 | Black-Ziegelbein et al. | |
| 7,500,232 B2 | 3/2009 | Das et al. | |
| 2006/0020931 A1 | 1/2006 | Clarke | |
| 2006/0026566 A1 | 2/2006 | Cabillic et al. | |
| 2006/0112399 A1 | 5/2006 | Lessly | |
| 2006/0143596 A1 | 6/2006 | Miyashita et al. | |
| 2008/0263295 A1 | 10/2008 | Printezis et al. | |
| 2009/0055806 A1 | 2/2009 | Tang | |
| 2009/0064099 A1 | 3/2009 | Foley | |

FOREIGN PATENT DOCUMENTS

CA 2593883 1/2008

OTHER PUBLICATIONS

Choi, Jong-Deok et al., "Escape Analysis for Java," OOPSLA '99, Nov. 1999, pp. 1-19.*
Ruf, Erik, "Effective Synchronization Removal for Java", slide presentation presented at Conference on Programming Language Design and Implementation, Jun. 18-21, 2000, Vancouver, BC, Canada.

(Continued)

*Primary Examiner*—Michael J Yigdall
(74) *Attorney, Agent, or Firm*—Levecque IP Law, P.C.

(57) ABSTRACT

Global escape analysis using instantiated type analysis (ITA) is applied to a method of an object-oriented application to analyze control flow beginning with an invocation of the method. The instantiated type analysis methodology (interprocedural control flow analysis) tracks instantiated objects, following both the flow of execution and the flow of these objects throughout the method invocations and field instances of the software, ultimately determining which instantiated objects do not escape. Not all method invocations must be followed and therefore a closed system is not required. This ITA algorithm has been enhanced for the purposes of escape analysis, so that is well-suited for runtime environments in which classes are loosely specified, or in circumstances in which a subset of a program is unavailable.

1 Claim, 2 Drawing Sheets

OTHER PUBLICATIONS

Nielsen, U.H. et al., Escape Analysis in the Jikes RVM, Project Report, May 27, 2003, URL: http://mads.danguah.dk/projekter/6sem/twoside/jikes_twoside.pdf.

Goetz, B., "Java Theory and Practice: Urban Performance Legends, Revisisted", IBM Devloperworks, Sep. 27, 2005, URL: http://www.ibm.com/developerworks/java/library/j-jtp09275.html.

Love, M., "Optimized Java", Dr. Dobb's Portal, Jun. 1, 2006, URL: http://www.ddj.com/java/188700760.

Veldma et al., Supporting Huge Address Spaces in a Virtual Machine for Java on a Cluster, Languages and Compilers for Parallel Computing: 20$^{th}$ International Workshop, LCPC 2007, Urbana, IL, Oct. 11-13, 2007, pp. 187-201.

Rinard, M. et al., A Classification System and Analysis for Aspect-Oriented Programs, SIGSOFT '04/FSE-12, Oct. 31-Nov. 6, 2004, Newport Beach, CA.

Choi, J.et al., Stack Allocation and Synchronization Optimizations for Java Using Escape Analysis, ACM Transactions on Programming Languages and Systems (TOPLAS), vol. 25, Issue 6, Nov. 2003, pp. 876-910.

Bogda, J. et al., Can a Shape Analysis Work at Run-Time?, Proceddings of the Java Virtual Machine Research and Technology symposium (JVM '01), Apr. 23-24, 2001, Monterey, CA.

Kotzmann, T. et al., Escape Analysis in the Context of Dynamic Compilation and Deoptimization, ACM/USENIX International Conference on Virtual Execution Environments, pp. 111-120, VEE '05, Jun. 11-12, 2005, Chicago, IL.

Lee, K. et al., A Two-Phase Escape Analysis for Parallel Java Programs, PACT '06, Sep. 16-20, 2006, Seattle, WA.

Blanchet, B., Escape Analysis for Java: Theory and Practice, ACM Transactions on Programming Languages and Systems (TOPLAS), vol. 25, Issue 6 (Nov. 2003), pp. 713-775.

Wang, L. et al., Escape Analysis for Synchronization Removal, Proceedings of the 2006 ACM Symposium on Applied Computing, Dijon, France, 2006, pp. 1419-1423.

Guyer, S. et al., Free-me: A Static Analysis for Automatic Individual Object Reclamation, PLDI '06, Jun. 11-14, 2006, Ottawa, Ontario, Canada.

* cited by examiner

GLOBAL ESCAPE ANALYSIS USING INSTANTIATED TYPE ANALYSIS

CROSS-REFERENCE TO RELATED APPLICATIONS

The present is related to Ser. No. 12/407,758, DETERMINING INTRA-PROCEDURAL OBJECT FLOW USING ENHANCED STACKMAPS, filed on even date herewith.

BACKGROUND

In object-oriented software applications, such as those using Java™, C++ and C# or other object-oriented programming languages, escape analysis determines whether objects instantiated during a method invocation or thread execution persist longer than the invocation or thread itself. This information is useful for various optimizations of the software, such as stack allocation of objects or lock elision.

In Java™, the lifetime of an object is determined by a concept known as reachability. If an object can be reached by an element of a running program, whether it is a static field or the call stack of a thread, or some other construct that maintains references to objects, then the object is live; otherwise, the lifetime of the object has ended.

Escape analysis involves tracking the lifetime of an object, which requires that the reachability of the object within the program at different times must be determined. A central issue is whether an object will remain reachable following the occurrence of a given event, and the most common events in question are method invocations (stream of instructions) or threads (stream of execution). When an object is known to be unreachable following these events, various performance optimizations, specific to that object, become available.

BRIEF SUMMARY

In accordance with embodiments consistent with the present invention, escape analysis using instantiated type analysis (ITA, an analysis of control flow and objects within a program) provides opportunities for optimizations of object-oriented code performance, such as Java™ code. The control flow analysis uses object flow between methods, advanced techniques for virtual method resolution, the use of generic objects, and other advanced techniques to maximize optimization potential. The analysis is quick and easily bounded in time and scope while still providing strong results, and is therefore suitable for both compile-time and run-time analysis. This ability is due in large part to a unique method-centric approach that separates intra-procedural from inter-procedural analysis, incorporates calling contexts on the thread stacks, and scales easily from global to local subsets of an application at the inter-procedural level.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

DETAILED DESCRIPTION

Figure 1:
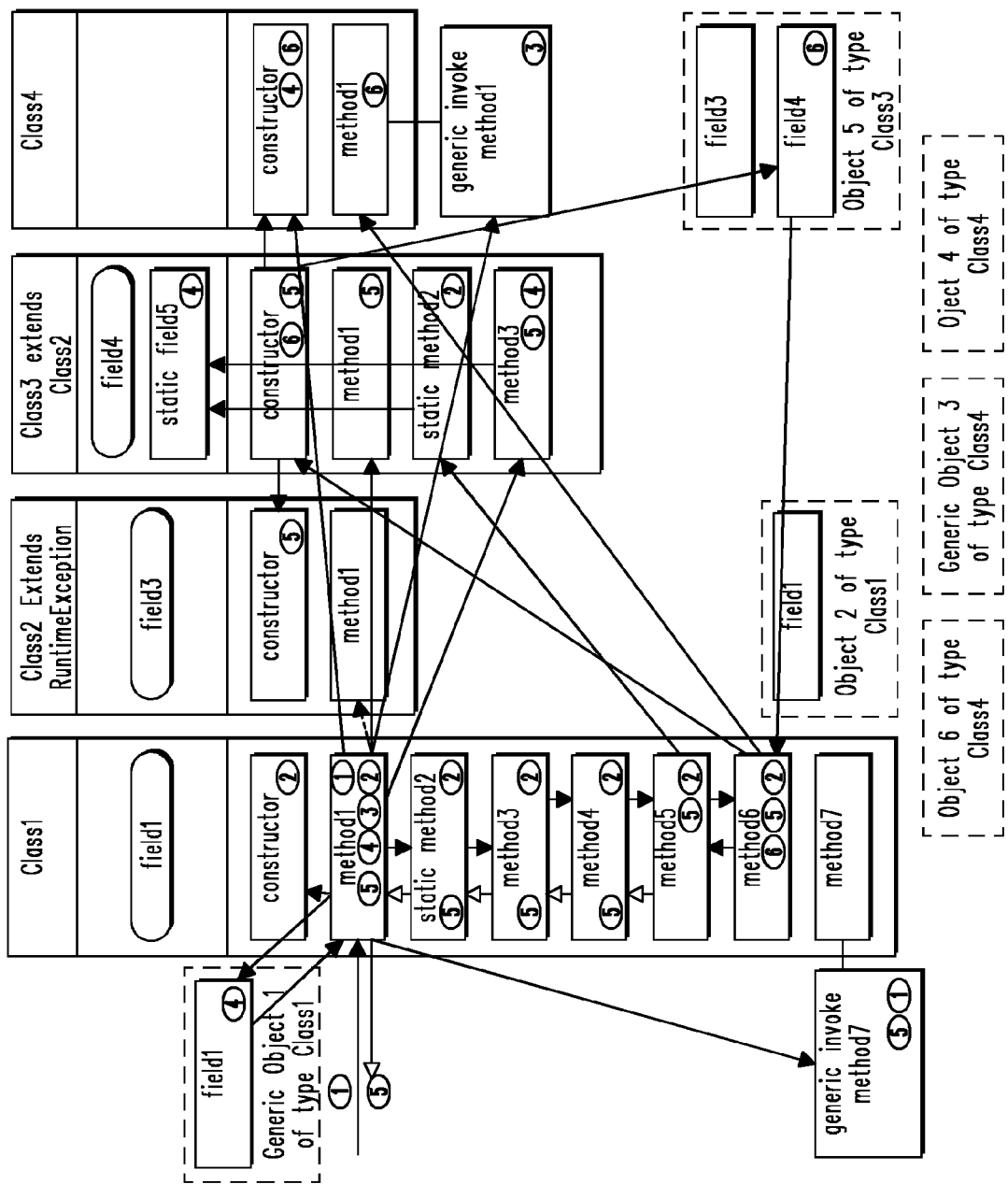
FIG. 1 is a connection graph representative of a Java™ code example, in accordance with various embodiments disclosed herein.

Global escape analysis using instantiated type analysis (ITA) is an inter-procedural control flow analysis that requires only a simply linear scan of each reachable method. The methodology is applied to a method of an object-oriented application to analyze control flow beginning with an invocation of the method. The instantiated type analysis methodology tracks instantiated objects, following both the flow of execution and the flow of these objects throughout the method invocations and field instances of the software, ultimately determining which instantiated objects do not escape. Not all method invocations must be followed and therefore a closed system is not required.

In accordance with embodiments consistent with the present invention, each escape analysis begins with a single method, referred to as an initial method, in the software being analyzed. The methodology has three phases to be considered:

1. Control Flow Analysis. A control flow analysis from the initial method of the software being analyzed. This control flow analysis instantiates objects and tracks their progress through the fields and method invocations in the program, starting from the initial method (also referred to as the base method).
2. Routes of Escape. All means of escape of the objects are identified. Means of escape include any static fields accessed, any thread objects, etc.
3. Escaping Objects. All objects reachable from the roots are traced. Unreachable objects do not escape.

Each of these three phases of escape analysis will be examined in turn.

Control Flow Analysis. ITA is a static control flow analysis algorithm designed to simulate the control flow of object-oriented programs. The analysis uses the instantiation of objects during static analysis to more accurately model control flow throughout the application at runtime. A distinguishing feature is the use of instantiated objects in the static analysis. The instantiation and tracking of individual objects through fields and methods allows the analysis to more accurately determine when instance fields and methods of classes can be accessed or invoked by an instruction due to the presence of a receiver object. Additionally, when ITA encounters a virtual method invocation, the receiver object itself determines which method will be invoked. Importantly for the escape analysis methodology, objects of the static analysis either escape, or they do not. These objects under analysis are representatives of objects at run-time, and whether they escape determines whether their run-time counterparts can possibly do the same.

The analysis described herein operates directly upon compiled bytecode, such as Java™ bytecode, constructing an elaborate static representation of the possible flow of objects into method invocations, between method invocations and data fields, and between method invocations and array elements. As methods are invoked, new objects are instantiated and new connections are established, connections which mimic the flow of objects during run-time. Objects are passed through these links. This type of data structure is typically called a connection graph in related research, although the connection graph of ITA typically differs from other connection graphs because ITA includes instantiated objects and their associated data fields; it also differs in that it can also resolve virtual invocations accurately using the objects receiving the invocations.

The ITA-based control flow analysis progresses in iterations. All method invocations, fields and array elements are considered propagators. During iterations, each propagator is checked to see if it can access other propagators, or whether it can propagate newly received objects to propagators previously accessed. When no more propagation is possible, control flow analysis is control.

A single object is instantiated for every new instruction encountered in the code that is deemed accessible by the control flow analysis, providing a one-limited scheme of object instantiation. Each object will have its own set of instance data fields. Each array will have a single associated array element data field, since the control flow does not distinguish between separate array elements.

The same method invocation representation is shared for every invocation of the same method (so that the analysis is guaranteed to eventually terminate). Each such method invocation stores a collection of objects that it has received from other invocations, from fields, and from array elements. This collection or set of objects includes objects passed as arguments to the invocation, objects read into the invocation from fields, objects returned to the invocation from invoked methods, and objects caught within the invocation. Additionally, each method invocation maintains a separate collection of objects that have been thrown into the method invocation from method invocations further up the call stack.

Each object maintains its own set of data field instances. Each field instance stores a collection of all objects that have been propagated to the data field by write instructions of method invocations. These objects are propagated to all method invocations which read from the same field instance.

As objects are received by a method invocation representation, they are propagated to any additional methods, fields, and array elements which have become accessible to the method, based on the object flow in the code. The type constraints imposed by the Java™ language, for example, constrain the flow. Java type constraints include the types of fields, the types of array elements, the types of method parameters, the types returned by methods, and the types that can be thrown from methods. When a method is invoked during the analysis, static methods within the method are invoked immediately (immediately in this context means the next iteration). Static fields are accessed immediately. Instance methods accessed within the method will not be invoked until the method invocation has received an object that can become the invoked receiver object. The invocated receiver object may be instantiated within the method itself, as determined by the object flow to the given invocation instruction within the code, or it may have been passed to the invocation from a field, array element or another method invocation. Objects that are received by fields or array elements are propagated to method invocations that read from the same field or array element.

Java™ code has some specialized methods that must be considered. If an object has a "finalize" method, which is a method with special invocation properties dictated by the Java™ language, then the method is automatically invoked as soon as the object is instantiated. Class initializers (also defined by the Java language) are ignored since they cannot allow objects to escape a method invocation or call stack.

Adaptations to ITA for Escape Analysis. Escape analysis does present unique challenges that require several adaptations to the ITA control flow analysis, which will be considered here.

Arguments to the Initial Method. The control flow analysis starts with a single method invocation, and this initial method invocation may have arguments, including the receiver object for non-static methods. These exact arguments, however, are unknown since the callers of the initial method are unknown.

In a closed system, this limitation can be overcome by passing multiple objects to the method, one for every possible subtype of the known type. A disadvantage of this approach is that no subtype can be omitted or the analysis is flawed, and it is not always possible to account for all types of arguments due to dynamic class loading at runtime. Another disadvantage occurs when computation time is limited, when it is not acceptable to absorb the additional overhead of instantiating numerous objects for each declared parameter type.

Contents of Static Fields. Static fields pose another challenge to escape analysis. When a static field is first accessed by a read instruction in the analysis, the possible contents of the field are unknown, because at run-time the field may have been populated before the invocation of the initial method in the analysis. In other words, because the analysis is not time-sensitive, it is not possible to determine the content of static fields.

Method Invocations not Followed. The ITA algorithm was initially designed to determine the reachable elements of an application, but this ability is not required for escape analysis. In fact, not all classes, methods or fields need to be analyzed for escape analysis to produce meaningful results. Modifications to the ITA algorithm can allow the analysis to provide results even when accessing partial subsets of the full application. In some cases, the analysis will be confined to a subset of the application because a method invocation cannot be followed. This occurs, for example, when a method has a native invocation that is unreadable by the analysis, or when a method is not available because it has not been loaded.

Generic Objects. A new construct, the "generic" object, is introduced to address these issues in which objects encountered or invocations followed are unknown. A "generic" object is an object whose exact type is unknown, and whose contents are unknown; what is known is the "base" type of the generic object. The object simultaneously represents multiple objects, one object for each subtype of the base type. When the object must assume a subtype of its base type, a second generic object is split from the first; the second generic object representing a subset of objects represented by the first generic object. Generic objects originate under the situations discussed above. They represent arguments to the initial method of an escape analysis, and they represent the pre-existing contents of static fields.

When a method invocation cannot be followed, it is possible to proceed with the analysis by avoiding the invocation of the method while at the same time assuming the invocation occurred, and by creating generic objects for any object that might have been received from the invoked method. Under this circumstance, a generic object is created for the returned objects, assuming the method returns objects, and all exception objects that can be thrown from the method invocation. This includes both the checked and unchecked exceptions. In Java™, for example, to account for all unchecked exceptions, it suffices to create one generic object of type RuntimeException, and another of type Error, which are the base types for all unchecked exceptions. The invocation not followed is represented as a generic method invocation. We have described generic objects being introduced by generic invocations.

Generic invocations are also introduced by generic objects themselves; when a virtual invocation occurs on a receiver object that is generic, the virtual method invocation cannot be resolved because the exact type of the invoked object is unknown, and so a generic invocation is used to represent this type of invocation as well.

Within the analysis, the same generic invocation of a given method can be shared for all generic invocations of that same method. There may also be a non-generic invocation of that method. The non-generic invocation will be accessed at all call sites of the method for which the method is static or the receiver object is known.

It can be seen that the there are a finite number of objects, a finite number of static fields and a finite number of method invocations. It is therefore known that the algorithm will eventually terminate when no more connections are possible, and no more object propagations are possible. When the control flow analysis is complete, the next phase of escape analysis may proceed.

Routes of Escape. The next phase of escape analysis in accordance with the disclosed embodiments is determining routes of escape. Once the control flow analysis is complete, it is possible to determine the routes of escape, which include:

- Invocations not followed (generic method invocations), such as those discussed at length above.
- Generic objects, such as those discussed at length above.
- Static fields
- Exception objects thrown and from the initial method, objects returned from the initial method
- Thread objects, which enable escape to other threads Escaping Objects. Any object which is reachable from one of the routes of escape is considered an escaping object. This includes:

- Objects that are routes of escape themselves, such as thread objects, and objects returned or thrown from the initial method.
- Any object stored to a static field or the instance field of an escaping object
- Any object that was passed as an argument to a generic method invocation In this stage of escape analysis, the fields of these escaping objects are traced recursively until all escaping objects are found. The remaining objects do not escape.

This escape analysis described herein is further elucidated by reference to an example. Consider the following Java™ code, to which FIGS. 1 and 2 make reference:

```
class Class1 {
   Class4 field1;
   Class1( ) { }
   void method1( ) {
   try {
      method2(new Class1( ));
   } catch(Class2 exception) {
      exception.method1( );
      Class4 local=method7 (exception);
      if(local !=null) {
         local.method1( );
      }
      field1=new Class4( );
      if(exception instance of Class3) {
         ((Class3) exception).method3(field1);
      }
      throw exception;
   }
   }
   static void method2(Class1 arg) {
      arg.method3( );
   }
   void method3( ) {
   method4(null);
   }
   void method4(Class3 arg) {
   method5(arg);
   }
   Class3 method5(Class3 arg) {
   Class3 local=method6( );
   Class3.method2(this);
   throw local;
   }
   Class3 method6( ) {
      Class3 local=new Class3( );
      local.field4.method1( );
      return local;
   }
   Class4 method7(Class2 arg) {
      return null;
   }
}
class Class2 extends
java.lang.RuntimeException {
boolean field2;
Class2 field3;
Class2( ) { }
Class4 method1( ) {
   field2=true;
   return null;
}
}
class Class3 extends Class2 {
   Class4 field4;
   static Class4 field5;
   Class3( ) {
   field4=new Class4( );
   }
   /**
   * overrides method1 in parent class
   */
   Class4 method1( ) {
   return null;
   }
   static void method2(Class1 arg) {
   field5=null;
   }
   final void method3(Class4 arg) {
   field5=arg;
   }
}
class Class4 {
   char[ ] field5;
   Class4( ) { }
   void method 1( ) { }
}
```

The connection graph of FIG. 1 illustrates the final connection graph that results from applying the modified ITA algorithm to the Java™ code. The six objects, Objects 1, 2, 3, 4, 5, and 6, are illustrated by encircled reference numerals as shown. As the iterations progress so that the relationships between the program artifacts (methods, fields and objects) are established, the escape analysis instantiates four objects: Objects 2, 4, 5, and 6. The other two objects, Objects 1 and 3, are generic. Generic Object 1 is introduced as an argument to the initial method, and generic Object 3 is introduced as the object returned from a generic method invocation. The precise ordering is undefined. Each iteration will attempt to establish new connections between objects, fields and methods. The following iteration will do the same, and this continues until no new connections are possible, resulting in the final connection graph as shown when the iterations have ended.

Figure 2:
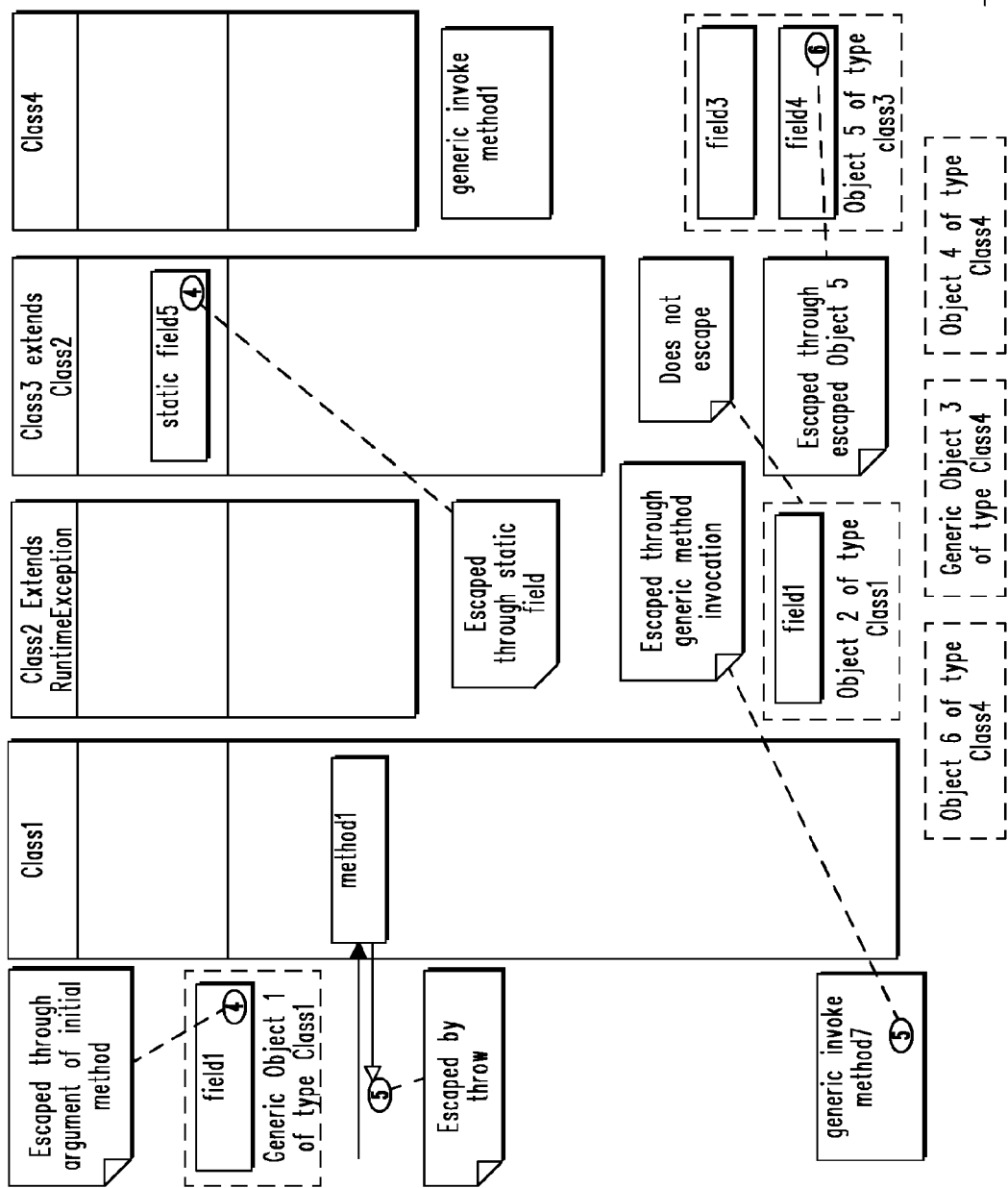
FIG. 2 is a connection graph, also based upon the Java™ code used in FIG. 1, which illustrates identified routes of escape of objects, in accordance with various embodiments disclosed herein.

Referring now to FIG. 2, the connection graph illustrates the routes of escape. The escape routes are the two generic objects, Objects 1 and 3, the two generic method invocations, the static field, and the object thrown from the initial method. The only object not traceable from a route of escape is Object 2, while all other objects escape.

It can be seen the various embodiments presented herein provide a method of static analysis of control flow and object flow within an object-oriented application. Starting with the invocation of a single method within the object-oriented application, the base method instantiates representations of objects that are created within the invocation of the base method, passes representations of objects as arguments to the invocation of the base method, accesses data fields, array elements and further method invocations reachable from the invocation of the base method, and passes all objects that can be passed into these reachable methods, fields and array elements. A single method representation is used to represent all invocations of the same method, and a single object representation is used to represent all object instantiated at a given instruction. Objects are passed from methods to methods, methods to fields, fields to methods, methods to array elements and array elements to methods as dictated by the semantics of the instructions that have established the connections, and as dictated by the object-oriented language itself, so that the flow of objects and the establishment of connections mimic the execution of the application at runtime. For each method that has been accessed from the base method, this procedure is repeated. For each field and array element that has been accessed, any objects within each field or array element are passed to methods to which connections have been established.

This is continued on any newly accessed method invocations, fields, or array elements, and is repeated iteratively until all methods, array elements and fields accessed can no longer establish any new connections to other methods, fields or array elements, or pass any objects through the previously established connections and there are no more connections or object propagations possible.

Following the termination of this control flow analysis and object flow analysis, a determination, such as a listing, of all possible routes of escape of objects permitting objects to persist longer than the invocation of the base method is made. All objects that have passed through these routes of escape are identified, these objects being the escaped objects while all other objects are those that have not escaped (unescaped objects). Using this information, the unescaped objects are identified. Advanced optimization techniques, such as lock elision and stack allocations, can be applied towards these unescaped objects when the application is executed at runtime. Optimization of these unescaped objects can occur when the object-oriented application is executed at run by applying one or more optimizations that require that the unescaped objects being optimized do not persist longer than a given method invocation in the object-oriented application at runtime.

It can be seen from the foregoing, that a new methodology of escape analysis utilizing instantiated type analysis (ITA) is very adept at determining non-escaping objects. The approach can be deployed in circumstances where previous algorithms could not, and it can detect objects not escaping that would be undetected by previous algorithms. The approach further measures escape with greater granularity than previous methods; it measures the failure of an object to escape from instantiating invocations (an instantiating invocation for an object is the invocation containing the instruction that created the object), the failure to escape from a specific invocation further down the call stack (a caller of the instantiating invocation), or the failure to escape from an invocation with a specific calling context (i.e. the object can escape from some call stacks but not others).

The ITA approach presented herein has certain characteristics that simulate control flow more accurately and smoothly. These various characteristics include resolution of virtual method invocations, the passage of objects throughout the application and the creation of object fields. Objects flow from one method to another based on calling context and object containment. Method connections are established based on object identity. Control flow between method invocations is accurately represented. Moreover, the improved ITA approach to escape analysis allows certain elements of the Java™ language to be handled quite aggressively, including array access, exception throwing, exception catching, and other elements of control flow.

The connection graphs presented herein differ from previously known ITA graphs. The ITA analysis described herein follows virtual invocations accurately by invoking according to the class type of the object being invoked. Additionally, if no objects arrive at a given invocation instruction, then no invocation occurs and no connected is established at all. This contrasts with previous ITA connection graphs which conservatively make connections to any and all possible invoked methods based upon all class hierarchies. Moreover, another distinction is the representation of objects, which themselves have data fields that propagate contained objects.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method of static analysis of control flow and object flow within an object-oriented application, comprising:
   invoking a base method of a plurality of methods within the object-oriented application, the base method further:
      instantiating a plurality of representations of objects that are created within the invocation of the base method of a plurality of objects of the object-oriented application, wherein a single object representation is used to represent all objects of the plurality of objects instantiated at a given instruction of the object-oriented application;
      passing the plurality of representations of the plurality of objects as arguments to the invocation of the base method;

accessing a plurality of reachable data fields, a plurality of reachable array elements and a plurality of further reachable method invocations reachable from the invocation of the base method;

passing all objects of the plurality of objects that can be passed into the plurality of reachable data fields, the plurality of reachable array elements and the plurality of further reachable method invocations of a plurality of reachable methods of the plurality of methods to establish a plurality of connections in accordance with a plurality of instructions of the object-oriented application;

wherein a single method invocation representation is used to represent all invocations of the same method, and a single object representation is used to represent all objects instantiated at a given instruction, and wherein the plurality of objects are passed from methods to methods of the plurality of further reachable methods, from methods of the plurality of further reachable methods to fields of the plurality of reachable data fields, from fields of the plurality of reachable data fields to methods of the plurality of further reachable methods, from methods of the plurality of further reachable methods to array elements plurality of reachable array elements and from array elements of the plurality of reachable array elements to methods of the plurality of further reachable methods in accordance with semantics of the plurality of instructions used to established the connections and a language of the object-oriented application so that the flow of objects and the establishment of connections mimic the execution of the object-oriented application at runtime, for each field of the plurality of reachable data fields and each array element of the plurality of reachable array elements, passing any objects of the plurality of reachable data fields and the plurality of reachable array elements to methods of the plurality of reachable methods that have established connections to said each field and said each array element;

repeating the invoking of reachable methods and the passing of objects for any newly accessed method invocations, fields, and array elements until all accessed method invocations, fields and array elements can no longer establish any new connections to other methods, fields or array elements, or pass any objects through previously established connections;

determining one or more possible routes of escape of objects from the plurality of objects from the object-oriented application, wherein the one or more possible routes of escape permit objects to persist longer than the invocation of the base method;

identifying a plurality of escaped objects of the plurality of objects that have escaped from the one or more routes of escape and identifying a plurality of unescaped objects of the plurality of objects that are not the plurality of escaped objects of the plurality of objects; and optimizing one or more of the plurality of unescaped objects when the object-orientated application is executed at runtime.

* * * * *